(No Model.)
D. C. RIPLEY.
GLASS CASTER STAND AND MOLD.
No. 278,745. Patented June 5, 1883.
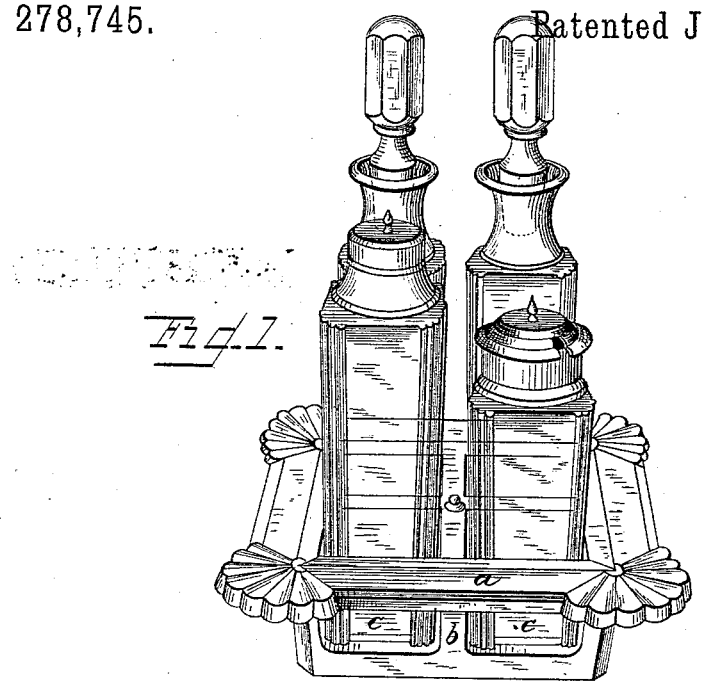
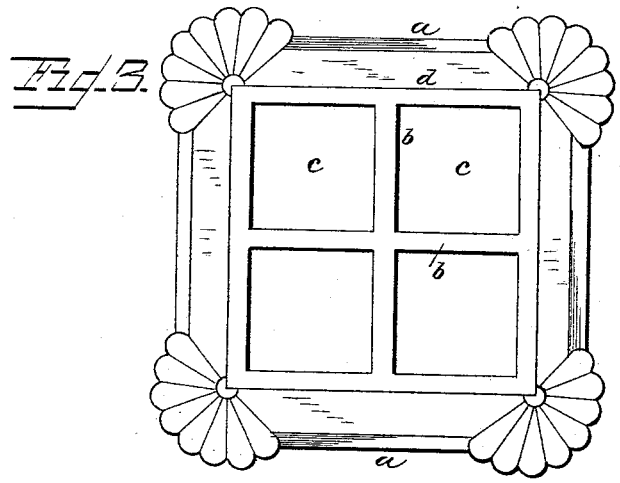
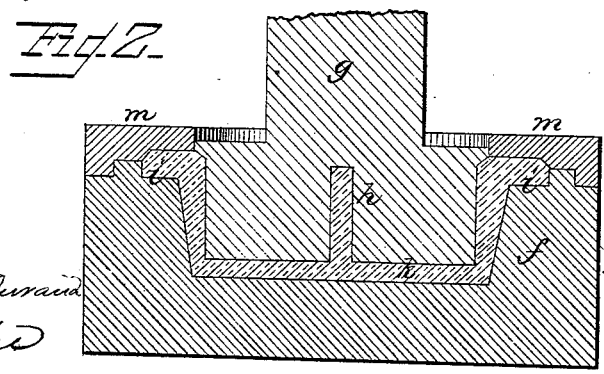
WITNESSES
INVENTOR
Daniel C. Ripley
by Bakewell & Kerr
his Attorneys

United States Patent Office.

DANIEL C. RIPLEY, OF PITTSBURG, PENNSYLVANIA.

GLASS CASTER-STAND AND MOLD.

SPECIFICATION forming part of Letters Patent No. 278,745, dated June 5, 1883.

Application filed April 3, 1883. (No model.)

*To all whom it may concern:*

Be it known that I, DANIEL C. RIPLEY, of Pittsburg, in the county of Allegheny and State of Pennsylvania, have invented a new and useful Improvement in Glass Caster-Stands and Molds; and I do hereby declare the following to be a full, clear, and exact description thereof, reference being had to the accompanying drawings, forming a part of this specification, in which—

Figure 1 is a perspective view of my improved table-caster. Fig. 2 is a vertical section of the mold and plunger, showing the caster-stand in cross-section. Fig. 3 is a plan view of the caster-stand.

Like letters of reference indicate like parts in each.

The caster-stand $a$ is in form like a shallow dish, with partitions $b$ connected to the sides and dividing the interior into receptacles $c$ for the bottles. It has also a flange, $d$, which extends laterally from its upper edge, and constitutes a handle by which the caster may be lifted. The body $a$, partitions $b$, and flange $d$ are integral, constituting one and the same piece of glass. The stand has a flat or substantially flat bottom, $e$, by which it rests on the table, and it is formed by pressing in a mold, $f$, of suitable shape, by means of a plunger, $g$, which has lateral cross-slots $h$ to make the partitions $b$. The mold $f$ has a recess, $i$, in its upper face, communicating with its central cavity, $k$, which recess extends under the ring $m$, for the purpose of forming the flange-handle $d$.

I do not limit myself to the form of the article shown.

The article thus described makes a cheap and handsome caster-stand, and one which is easily handled and not liable to be overturned.

What I claim as my invention, and desire to secure by Letters Patent, is—

1. A glass-mold for making glass caster-stands in one piece, having a lateral recess extending around the mouth, in combination with a ring over said recess and encircling the mouth, and a plunger for forming the same with bottle-receptacles, substantially as and for the purpose described.

2. A glass caster-stand having cavities for receiving the bottles, and a handle-flange extending laterally from the body, substantially as and for the purposes described.

3. A glass caster-stand having cavities for holding the bottles, a flat bottom, and a handle-flange extending laterally from its upper edge, substantially as and for the purposes described.

In testimony whereof I have hereunto set my hand this 30th day of March, A. D. 1883.

DANIEL C. RIPLEY.

Witnesses:
W. B. CORWIN,
J. K. SMITH.